United States Patent [19]

Tosto

[11] Patent Number: 4,674,118
[45] Date of Patent: Jun. 16, 1987

[54] TELEPHONE LINE HOLD AND HOLD RELEASE APPARATUS

[75] Inventor: Roger J. Tosto, Yorktown Heights, N.Y.

[73] Assignee: Tie/Communications, Inc., Shelton, Conn.

[21] Appl. No.: 715,725

[22] Filed: Mar. 25, 1985

[51] Int. Cl.[4] .............................................. H04M 1/72
[52] U.S. Cl. ..................................... 379/393; 379/396
[58] Field of Search ................ 179/81 R, 84 R, 99 H, 179/99 R

[56] References Cited

U.S. PATENT DOCUMENTS 4,387,274  6/1983  Stein et al. ........................ 179/81 R
4,440,981  4/1984  Grantland et al. ............... 179/81 R Primary Examiner—James L. Dwyer
Attorney, Agent, or Firm—Francis N. Carten

[57] ABSTRACT

A telephone line hold and hold release circuit which, after a central office line which is connected to at least two telephone sets in a telephone terminal system has been seized in response to an incoming call and then placed on HOLD, releases that central office line from the HOLD condition in response to either (i) the reclosing of the hookswitch of the telephone set which seized the central office line, or (ii) the closing of the hookswitch of another telephone set connected to that central office line, or (iii) the release of the central office line by the caller.

16 Claims, 1 Drawing Figure

TELEPHONE LINE HOLD AND HOLD RELEASE APPARATUS

BACKGROUND OF THE INVENTION

In the utilization of a telephone system including two or more telephone sets connected to a common central office (C.O.) line, a user frequently will first take or initiate a call on one telephone set and then, for a variety of reasons, will subsequently move to another part of the house or office to continue the call on another telephone set. Alternatively, an incoming call may be for a third party, who may wish to take the call on a telephone set other then the one on which the answering party took the call initially. In such a telephone system, at least the telephone set on which a call is taken or initiated may include a pushbutton-activated HOLD circuit in order to maintain seizure of the common C.O. line after the handset is returned to its cradle, i.e., after the hookswitch is re-opened. Then, the call may be continued on a second telephone set connected to the same C.O. line; or the call may be re-established on the first telephone set; or the caller might hang up the handset of the telephone set. Under each of these three conditions, the C.O. line should be released from the HOLD condition.

An appropriate impedance termination is connected across the tip and ring telephone wires when placing a call on hold. This impedance termination is required to maintain current flow to the central office equipment when the telephone handset is returned to its cradle. The voltage developed across the hold impedance termination will vary as a function of the central office voltage, the plant and loop resistance and the resistance of the hold impedance termination itself. The voltage and current at the telephone may also be momentarily interrupted by the central office equipment in order to accomplish certain signalling functions and reconfigurations. The loop interruptions will vary in time, may have a specific signalling purpose for the telephone, or may simply be an intermittent result of plant reconfiguration. Furthermore, the voltage developed across the hold termination will change as an associated extension telephone goes off-hook. The amount of change also is a function of loop parameters such as voltage and resistance. The HOLD and HOLD release circuit must, therefore, adjust to and operate over a wide range of loop conditions while distinguishing between unintentional and intentional signals or loop changes. The circuit preferably derives its operating power directly from the telephone line without requiring external sources of power.

SUMMARY OF THE INVENTION

The present invention is embodied in and carried out by a telephone system including at least two telephone sets connected to a common C.O. line, in which the first or main phone includes a HOLD and HOLD release circuit for effecting release of the common C.O. line, after it has been seized and placed on HOLD, by either re-closing the hookswitch of the first or main phone, or by closing the hookswitch of a second or extension phone, or in response to a signal from the central office indicating that the caller has released the C.O. line.

BRIEF DESCRIPTION OF THE DRAWING

The present invention may be better understood by reading the written description thereof with reference to the drawing, which comprises a schematic wiring diagram representing the hold and hold release circuit in a typical telephone configuration. Telephone circuits not essentially related to the hold and hold release circuitry are shown in block form.

DETAILED DESCRIPTION OF THE PREFERRED EMBODIMENT

Figure 1:
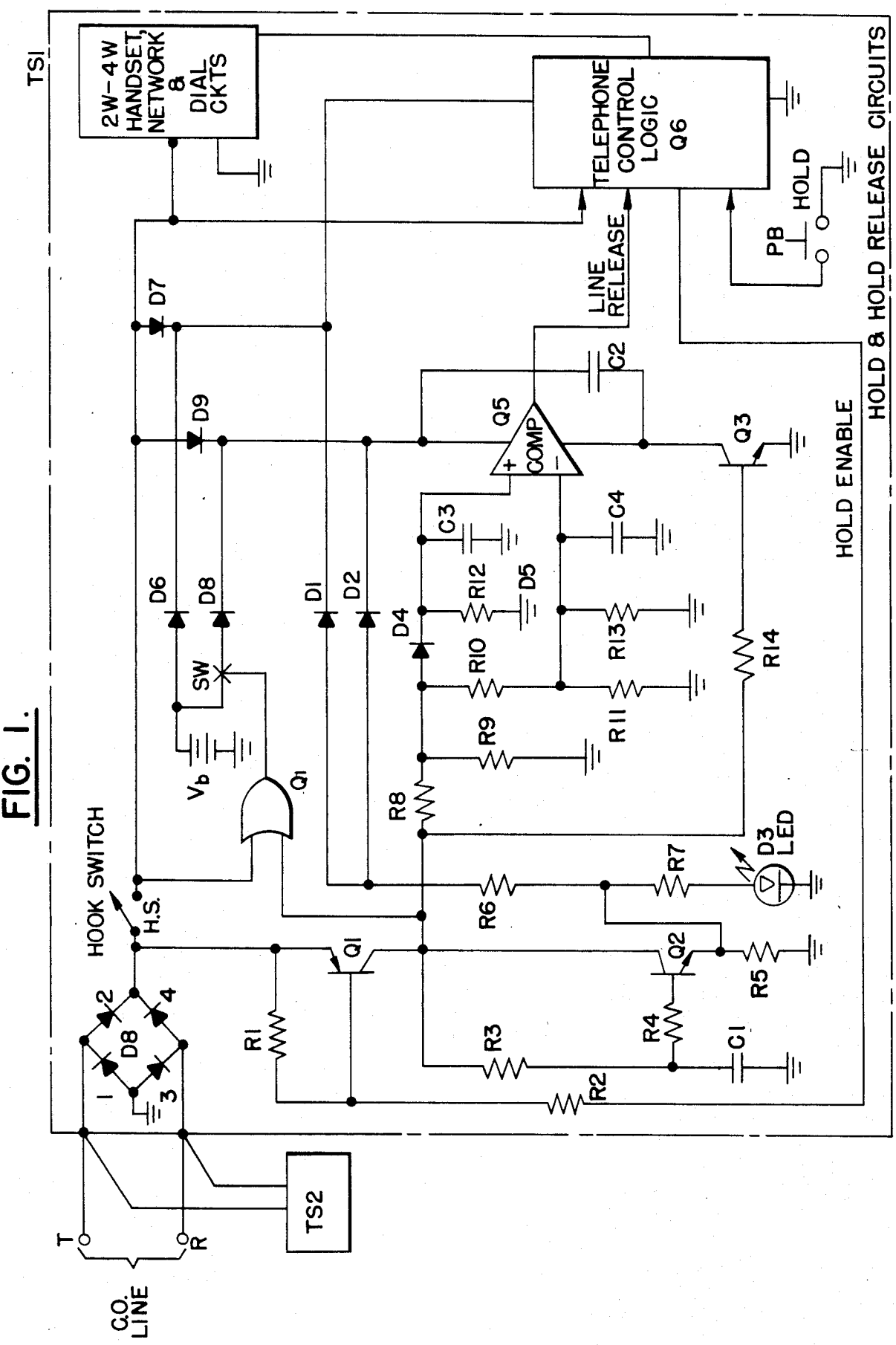

The telephone set TS1 connects to the telephone line tip and ring wires T,R through diode bridge DB, which provides the required voltage polarities to the telephone circuits. Hookswitch HS connects the telephone circuits to the C.O. line through diode bridge DB when the handset is removed from the telephone cradle or base. The two-wire to four-wire handset network and address-signalling dial circuit is shown in block form. Battery $V_b$ maintains the volatile memory of the automatic dialing circuits, when such circuits are provided in the telephone set TS1, while in the on-hook condition. The battery Vb also supplements voltage to the telephone circuits under long loop conditions, but is not required for that purpose. Diodes D6, D7, D8 and D9 and normally-open switch SW serve to deliver power to the telephone circuitry from the battery $V_b$ and the C.O. line. Switch SW is controlled by OR gate Q4, which responds to either a closed hookswitch HS (i.e., the off-hook condition) or a voltage across the hold termination impedance (i.e., the hold condition) by closing switch SW to apply power from battery $V_b$ through diode D8 to comparator Q5. This arrangement assures adequate power to comparator Q5, regardless of variations in C.O. line loop voltage, while at the same time conserving the power of battery $V_b$ when comparitor Q5 does not need to be energized.

The hold condition is established by momentarily pressing a HOLD push button PB on the telephone set TS1 and returning the handset to the telephone cradle. The HOLD button PB need not be pressed while the handset is returned to the cradle, since the telephone control logic Q6 latches in the hold state. The telephone control logic Q6 causes the Hold Enable line to go low in response to the actuation of HOLD push button PB thereby turning on transistor Q1. Transistor Q1 supplies voltage to transistor Q2 and causes that transistor to turn on. A path is then established for telephone loop current to flow from the C.O. line tip conductor T, through diode 2 of diode bridge DB, transistor Q1, transistor Q2, resistor R5, diode 3 of diode bridge DB and back to the C.O. line ring conductor R. The voltage developed across resistor R5, as a result of the loop current, establishes an operating potential for the telephone circuits while in the hold mode. The value of resistor R5 is selected to provide the minimum current requirements of the central switch equipment to maintain the loop connection while on hold and to provide the maximum operating voltage potential to telephone circuits in the hold condition. The light-emitting diode (LED) D3 and resistor R7 form a series circuit which is in parallel with resistor R5 and provides a visual indication that the telephone is in the hold mode.

While the telephone set TS1 is in the hold condition, the telephone control logic Q6 and comparitor Q5 receive their operating voltage from the C.O. line through diodes D1 and D2 and resistor R6. Battery $V_b$ maintains minimum voltage levels at the telephone circuits under long loop conditions. The battery $V_b$ is not essential for hold and hold release circuit operation since the voltage developed by the flow of loop current from tip T to ring R provides sufficient operating potential for the circuits even when the loop current is at minimum levels. The comparitor Q5 receives operating voltage from the C.O. line via diode D2 and is enabled when transistor Q3 is turned on. The voltage developed at the junction of transistors Q1 and Q2 drives the base of transistor Q3, and turns it on when the telephone set TS1 is in the hold mode, thereby enabling the comparitor Q5. the voltage at the junction of transistors Q1 and Q2 also drives the two inputs to the comparitor Q5. The voltage at the comparitor inputs determine if the telephone set TS1 maintains or releases the hold condition. Resistors R8 and R9 form a divider network which assures that the comparitor $V_{cc}$ is more positive than the input common-mode voltage for proper operation of the comparitor Q5. Resistors R10 and R11 form a divider network which established the voltage levels at the inputs to the comparitor Q5. In the steady-state hold condition, the voltage at one comparitor input ($+$) exceeds the other input ($-$), which drives the output of comparitor Q5 to a level (high) which is interpreted by the telephone control logic Q6 as a hold signal. The control circuit Q6 maintains the hold condition until the comparitor Q5 output changes state or some other release signal is received.

The telephone may be released from the hold condition in any one of three ways: (1) by lifting the handset from the telephone cradle; (2) by detecting an extension telephone going off-hook on the common telephone line; or (3) by detecting an abandon-call release signal from the central office switching equipment. When the handset is lifted from the telephone cradle, hookswitch HS closes and thereby causes voltage to be present on the Station Hold Release line to the telephone control logic Q6. The control logic Q6 drives the Hold Enable line to a high state which causes transistors Q1 and Q2 to turn off, thereby removing the hold termination impedance.

The hold release circuitry will also release the hold condition when a change in voltage level on the C.O. line is detected for a minimum defined time interval. The voltage level change can be due to an interruption of the C.O. line voltage by the central office equipment, or by an extension telephone set TS2 going off-hook on the common C.O. line. An extension telephone, in going off-hook, causes the loop voltage at the hold-originating telephone set TS1 to decrease since the extension phone TS2 places an additional termination in parallel with the hold circuit of the main phone TS1. The voltage at the junction of transistors Q1 and Q2 and across resistor network R10 and R11 declines in direct proportion to the decrease in loop voltage at the C.O. line tip and ring terminals T, R. Similarly, an interruption of the C.O. line loop current by the central office equipment results in an absence of voltage developed across the above-mentioned components.

In the hold mode, capacitor C3 charges up to the voltage level present across resistors R10 and R11 minus the voltage drop across diode D4. Similarly, capacitor C4 charges up to the voltage level present across resistor R11 minus the voltage drop across diode D5. The voltage across each capacitor is proportional to the C.O. line voltage. Diode D4 and D5 prevent capacitors C3 and C4 from discharging through resistors R10, R11, R9, R8 and other associated circuits when the voltage across R10 and R11 decreases as a result of an extension telephone TS2 going off-hook or as a result of an interruption of the loop voltage. The voltage developed across capacitor C4 serves as a reference voltage for the comparitor Q5. The discharge path for C4 is through resistor R13. A slow discharge rate is provided for the capacitor C4 in order that the reference voltage for the comparitor Q5 be stable. The circuit time constant is set to be greater than ten times the response time desired for the hold release operation.

The voltage developed across capacitor C3 determines the hold state of the circuit. The discharge path for capacitor C3 is through resistor R12. The time constant of the circuit is set so that the capacitor C3 discharges to the voltage level on capacitor C4 in the desired time period. The divider network formed by resistors R10 and R11 is selected to allow the voltage at the R10/D4 junction to decrease below the voltage that was present across resistor R11. The voltage at this junction will decrease or go to zero as a result of an extension telephone set TS2 going off-hook on the C.O. line, or due to an interruption of the C.O. line voltage, respectively. Capacitor C3 is, therefore, allowed to discharge to a value below the former R11 voltage.

The comparitor Q5 will switch output state when the voltage on capacitor C3 drops below the voltage on capacitor C4. The comparitor output is provided to the telephone control logic Q6, which interprets the new comparitor output (low) as a hold release signal. The control logic Q6 drives the Hold Enable line to a high state, which turns off transistors Q1 and Q2, thereby removing the hold termination. The circuit and the telephone set TS1 is, therefore, restored to the idle, on-hook condition.

The response time of the hold release circuit is established by networks C3/R12 and C4/R13 and is selected to provide the desired release time. Release time requirements may differ due to the anticipated worst case loop interruptions which may occur on the telephone line. Loop interruptions in excess of 350 milliseconds may be encountered under certain central office reconfigurations. The response time to hold release is the same for both loop interruptions and extension telephones release of hold.

The hold release circuit is relatively independent of the telephone loop since the comparitor Q5 input circuit automatically adjusts to the range of loop voltages and currents supplied by the C.O. line. The circuit receives operating power from the C.O. line. A battery $V_b$ may be used to ensure that the operating voltage $V_{cc}$ of comparitor Q5 and/or telephone control logic Q6 is maintained at minimum requirements under conditions of very long loop lengths. The telephone control logic Q6 may be a microprocessor or other control circuitry which performs similar control functions.

The advantages of the present invention, as well as certain changes and modifications to the disclosed embodiment thereof, will be readily apparent to those skilled in the art. It is the applicant's intention to cover all those changes and modifications which could be made to the embodiment of the invention herein chosen for the purposes of the disclosure without departing from the spirit and scope of the invention.

I claim:

1. A telephone system comprising at least first and second telephone sets, each being connected to at least one common central office line, at least one of said telephone sets including a line hold and hold release means operative to cause release of said common central office line from the hold condition in response to either reclosing the hookswith of the telephone set on which a call is received, or closing the hookswitch of a telephone set on which the call is not received, or detecting a signal from the central office indicating that the caller has released the central office line, said line hold and hold release means comprising:

(a) hold control means;
(b) comparitor circuit means;
(c) control logic circuit means operative to receive a first input signal from said hold control means, a second input signal from said comparitor circuit means, and a third input signal from the hookswitch of the associated telephone set; and
(d) hold termination impedance circuit means including:
  (i) a hold termination impedance; and
  (ii) first and second transistor circuit means, said first transistor circuit means being operative in response to a signal generated by said control logic circuit means upon actuation of said hold control means to turn on said second transistor circuit means, thereby enabling the flow of loop current through said first and second transistor circuit means and said hold termination impedance.

2. A telephone set comprising:
(a) handset network and dial circuit means;
(b) a hookswitch;
(c) power circuit means connected to said hookswitch; and
(d) line hold and hold release means operative to cause release from a hold condition of a common central office line connected to at least one other telephone set in response to either reclosing said hookswitch after receiving an incoming call on said common central office line, or closing the hookswitch of the other telephone set, or detecting a signal from the central office indicating that the caller has released the central office line, said line hold and hold release means comprising:
  (i) hold control means;
  (ii) comparitor circuit means;
  (iii) control logic circuit means operative to receive a first input signal from said hold control means, a second input signal from said comparitor circuit means, and a third input signal from said hookswitch; and
  (iv) hold termination impedance circuit means including a hold termination impedance and first and second transistor circuit means, said first transistor circuit means being operative in response to a signal generated by said control logic circuit means upon actuation of said hold control means to turn on said second transistor circuit means, thereby enabling the flow of loop current through said first and second transistor circuit means and said hold termination impedance.

3. The improvement according to claim 1, wherein visual indicator means is connected in parallel with said hold termination impedance.

4. The improvement according to claim 1, wherein said comparitor circuit means comprises:
(a) comparitor means having first and second input terminals and an output terminal;
(b) enabling circuit means operative to enable said comparitor means in response to a signal from said hold termination impedance circuit means; and
(c) first and second input circuit means connected to said first and second input terminals of said comparitor means, which is operative to generate a hold signal at said output terminal when the signal at said first input terminal exceeds the signal at said second input terminal.

5. The improvement according to claim 4, wherein said first and second input circuit means each comprises:
(a) a resistance and a capacitance connected in parallel;
(b) a diode connected to allow charging current to flow to said capacitance and to confine the flow of discharge current from said capacitance through said resistance; and
(c) voltage divider means common to both said first and second input circuit means, and operative when energized by said hold impedance circuit means to provide a higher voltage to said first input circuit means and a lower voltage to said second input circuit means.

6. The improvement according to claim 5, wherein the discharge rate of said capacitance in said first input circuit means is faster than the discharge rate of said capacitance in said second input circuit means.

7. The improvement according to claim 6, wherein said capacitance in said first input circuit means discharges to the level of the voltage across said capacitance in said second input circuit means a predetermined period of time after either the de-energization of said voltage divider means, or a predetermined reduction in the voltage applied to said voltage divider means.

8. The improvement according to claim 1, wherein said control logic circuit means is operative, in response to actuation of said hold control means, to latch the hold condition so that said hold control means need not be continuously actuated until the hookswitch of said first telephone set is re-opened.

9. The improvement according to claim 1, wherein said control logic circuit means is operative, in response to a signal from either the hookswitch of the associated telephone set or the comparitor circuit means, to cause said hold termination impedance circuit means to disconnect said hold termination impedance from said common central office line.

10. The telephone set according to claim 2, wherein visual indicator means is connected in parallel with said hold termination impedance.

11. The telephone set according to claim 2, wherein said comparitor circuit means comprises:
(a) comparitor means having first and second input terminals and an output terminal;
(b) enabling circuit means operative to enable said comparitor means in response to a signal from said hold termination impedance circuit means; and
(c) first and second input circuit means connected to said first and second input terminals of said comparitor means, which is operative to generate a hold signal at said out put terminal when the signal at said first input terminal exceeds the signal at said second input terminal.

12. The telephone set according to claim 11, wherein said first and second input circuit means each comprises:
(a) a resistance and a capacitance connected in parallel;

(b) a diode connected to allow charging current to flow to said capacitance and to confine the flow of discharge current from said capacitance through said resistance; and (c) voltage divider means common to both said first and second input circuit means, and operative when energized by said hold impedance circuit means to provided a higher voltage to said first input circuit means and a lower voltage to said second input circuit means.

13. The telephone set according to claim 12, wherein the discharge rate of said capacitance in said first input circuit means is faster than the discharge rate of said capacitance in said second input circuit means.

14. The telephone set according to claim 13, wherein said capacitance in said first input circuit means discharges to the level of the voltage across said capacitance in said second input circuit means a predetermined period of time after either the de-energization of said voltage divider means, or a predetermined reduction in the voltage applied to said voltage divider means.

15. The telephone set according to claim 2, wherein said control logic circuit means is operative, in response to actuation of said hold control means, to latch the hold condition so that said hold control means need not be continuously actuated until the hookswitch of said first telephone set is re-opened.

16. The telephone set according to claim 2, wherein said control logic circuit means is operative, in response to a signal from either said hookswitch or the comparitor circuit means, to cause said hold termination impedance circuit means to disconnect said hold termination impedance from the common central office line.

* * * * *